US012561419B2

(12) United States Patent
Chauhan et al.

(10) Patent No.: US 12,561,419 B2
(45) Date of Patent: Feb. 24, 2026

(54) USAGE-BASED ACCESS AUTHORIZATION FOR SOFTWARE CODE OF MULTI-PATH INPUT-OUTPUT DRIVERS

(71) Applicant: Dell Products L.P., Round Rock, TX (US)

(72) Inventors: Surendra Singh Chauhan, Kishangarh (IN); Udit Tyagi, Bangalore (IN); Manikandan Sethuraman, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 437 days.

(21) Appl. No.: 18/093,539

(22) Filed: Jan. 5, 2023

(65) Prior Publication Data

US 2024/0232318 A1    Jul. 11, 2024

(51) Int. Cl.
*G06F 21/34*    (2013.01)
(52) U.S. Cl.
CPC .................................... *G06F 21/34* (2013.01)
(58) Field of Classification Search
CPC ................................ G06F 21/34; G06F 21/10
See application file for complete search history.

(56) References Cited

U.S. PATENT DOCUMENTS

| | | |
|---|---|---|
| 6,567,397 B1 | 5/2003 | Campana, Jr. et al. |
| 6,687,746 B1 | 2/2004 | Shuster et al. |
| 6,697,875 B1 | 2/2004 | Wilson |
| 7,275,103 B1 | 9/2007 | Thrasher et al. |

(Continued)

FOREIGN PATENT DOCUMENTS

| | | |
|---|---|---|
| CN | 103677927 B | 2/2017 |
| EP | 1117028 A2 | 7/2001 |

(Continued)

OTHER PUBLICATIONS

International Search Report and Written Opinion of PCT/US2019/052549 dated Dec. 4, 2019, 13 pages.

(Continued)

*Primary Examiner* — Farid Homayounmehr
*Assistant Examiner* — Suman Debnath
(74) *Attorney, Agent, or Firm* — Ryan, Mason & Lewis, LLP

(57)    ABSTRACT

An apparatus comprises a processing device configured to obtain, from an access authorization server, a usage-based access authorization for software associated with controlling delivery of input-output operations to a storage system over selected ones of a plurality of paths through a network. The processing device is also configured to provision access authorization for the software to multi-path input-output drivers of a plurality of host devices. The processing device is further configured to receive, from the multi-path input-output drivers, usage information characterizing usage by the host devices of the software over a designated time period. The processing device is further configured to modify the provisioning of the access authorization for the software to the multi-path input-output drivers responsive to determining that the usage of the software by the host devices over the designated time period exceeds an allowable amount of usage specified in the usage-based access authorization.

20 Claims, 5 Drawing Sheets

(56) References Cited

U.S. PATENT DOCUMENTS

| | | | |
|---|---|---|---|
| 7,454,437 | B1 | 11/2008 | Lavallee et al. |
| 7,617,292 | B2 | 11/2009 | Moore et al. |
| 7,668,981 | B1 | 2/2010 | Nagineni et al. |
| 7,770,053 | B1 | 8/2010 | Bappe et al. |
| 7,809,912 | B1 | 10/2010 | Raizen et al. |
| 7,818,428 | B1 | 10/2010 | Lavallee et al. |
| 7,890,664 | B1 | 2/2011 | Tao et al. |
| 7,904,681 | B1 | 3/2011 | Bappe et al. |
| 7,925,872 | B2 | 4/2011 | Lai et al. |
| 8,250,256 | B2 | 8/2012 | Ghosalkar et al. |
| 8,285,825 | B1 | 10/2012 | Nagaraj et al. |
| 8,321,948 | B2 | 11/2012 | Robinson et al. |
| 8,825,919 | B1 | 9/2014 | Lim et al. |
| 8,832,334 | B2 | 9/2014 | Okita |
| 8,874,746 | B1 | 10/2014 | Gonzalez |
| 8,984,220 | B1 | 3/2015 | Gill et al. |
| 9,026,694 | B1 | 5/2015 | Davidson et al. |
| 9,201,803 | B1 | 12/2015 | Derbeko et al. |
| 9,400,611 | B1 | 7/2016 | Raizen |
| 9,430,368 | B1 | 8/2016 | Derbeko et al. |
| 9,594,780 | B1 | 3/2017 | Esposito et al. |
| 9,647,933 | B1 | 5/2017 | Tawri et al. |
| 9,672,160 | B1 | 6/2017 | Derbeko et al. |
| 9,778,852 | B1 | 10/2017 | Marshak et al. |
| 10,289,325 | B1 | 5/2019 | Bono |
| 10,353,714 | B1 | 7/2019 | Gokam et al. |
| 10,439,878 | B1 | 10/2019 | Tah et al. |
| 10,474,367 | B1 | 11/2019 | Mallick et al. |
| 10,476,960 | B1 | 11/2019 | Rao et al. |
| 10,521,369 | B1 | 12/2019 | Mallick et al. |
| 10,606,496 | B1 | 3/2020 | Mallick et al. |
| 10,637,917 | B2 | 4/2020 | Mallick et al. |
| 10,652,206 | B1 | 5/2020 | Pusalkar et al. |
| 10,754,572 | B2 | 8/2020 | Kumar et al. |
| 10,757,189 | B2 | 8/2020 | Mallick et al. |
| 10,764,371 | B2 | 9/2020 | Rao et al. |
| 10,789,006 | B1 | 9/2020 | Gokam et al. |
| 10,817,181 | B2 | 10/2020 | Mallick et al. |
| 10,838,648 | B2 | 11/2020 | Sharma et al. |
| 10,880,217 | B2 | 12/2020 | Mallick et al. |
| 10,884,935 | B1 | 1/2021 | Doddaiah |
| 10,911,402 | B2 | 2/2021 | Pusalkar et al. |
| 10,936,220 | B2 | 3/2021 | Mallick et al. |
| 10,949,104 | B2 | 3/2021 | Marappan et al. |
| 10,996,879 | B2 | 5/2021 | Gokam |
| 11,016,699 | B2 | 5/2021 | Anchi et al. |
| 11,016,783 | B2 | 5/2021 | Rao et al. |
| 11,032,373 | B1 * | 6/2021 | Mallick .............. H04L 41/0896 |
| 11,093,155 | B2 | 8/2021 | Anchi et al. |
| 11,106,381 | B2 | 8/2021 | Rao et al. |
| 11,126,363 | B2 | 9/2021 | Tidke et al. |
| 11,157,203 | B2 | 10/2021 | Gokam et al. |
| 11,366,771 | B2 | 6/2022 | Smith et al. |
| 11,372,951 | B2 | 6/2022 | Sokkalal et al. |
| 11,422,718 | B1 * | 8/2022 | Chauhan .............. G06F 3/0635 |
| 2002/0023151 | A1 | 2/2002 | Iwatani |
| 2002/0103923 | A1 | 8/2002 | Cherian et al. |
| 2004/0010563 | A1 | 1/2004 | Forte et al. |
| 2006/0026346 | A1 | 2/2006 | Kadoiri et al. |
| 2006/0277383 | A1 | 12/2006 | Hayden et al. |
| 2007/0174849 | A1 | 7/2007 | Cheung et al. |
| 2008/0043973 | A1 | 2/2008 | Lai et al. |
| 2008/0082976 | A1 | 4/2008 | Steinwagner et al. |
| 2008/0201458 | A1 | 8/2008 | Salli |
| 2008/0243699 | A1 | 10/2008 | Hilerio et al. |
| 2008/0301332 | A1 | 12/2008 | Butler et al. |
| 2009/0249329 | A1 | 10/2009 | Dash |
| 2009/0259749 | A1 | 10/2009 | Barrett et al. |
| 2009/0300641 | A1 | 12/2009 | Friedman et al. |
| 2009/0328225 | A1 | 12/2009 | Chambers et al. |
| 2010/0205303 | A1 | 8/2010 | Chaturvedi et al. |
| 2010/0293619 | A1 | 11/2010 | Hayami |
| 2010/0313063 | A1 | 12/2010 | Venkataraja et al. |
| 2011/0047624 | A1 | 2/2011 | Vedantam et al. |
| 2011/0197027 | A1 | 8/2011 | Balasubramanian et al. |

| | | | |
|---|---|---|---|
| 2011/0296230 | A1 | 12/2011 | Chen et al. |
| 2012/0102369 | A1 | 4/2012 | Hiltunen et al. |
| 2012/0246345 | A1 | 9/2012 | Contreras et al. |
| 2013/0117766 | A1 | 5/2013 | Bax et al. |
| 2013/0339551 | A1 | 12/2013 | Flanagan et al. |
| 2014/0105068 | A1 | 4/2014 | Xu |
| 2015/0222705 | A1 | 8/2015 | Stephens |
| 2015/0242134 | A1 | 8/2015 | Takada et al. |
| 2016/0092136 | A1 | 3/2016 | Balakrishnan et al. |
| 2016/0117113 | A1 | 4/2016 | Li et al. |
| 2016/0335003 | A1 | 11/2016 | Ahmed et al. |
| 2017/0235507 | A1 | 8/2017 | Sinha et al. |
| 2018/0189635 | A1 | 7/2018 | Olarig et al. |
| 2018/0253256 | A1 | 9/2018 | Bharadwaj |
| 2018/0317101 | A1 | 11/2018 | Koue |
| 2019/0095299 | A1 | 3/2019 | Liu et al. |
| 2019/0108888 | A1 | 4/2019 | Sarkar et al. |
| 2019/0334987 | A1 | 10/2019 | Mallick et al. |
| 2020/0021653 | A1 | 1/2020 | Rao et al. |
| 2020/0097203 | A1 | 3/2020 | Mallick et al. |
| 2020/0106698 | A1 | 4/2020 | Rao et al. |
| 2020/0110552 | A1 | 4/2020 | Kumar et al. |
| 2020/0112608 | A1 | 4/2020 | Patel et al. |
| 2020/0192588 | A1 | 6/2020 | Kumar et al. |
| 2020/0204475 | A1 | 6/2020 | Mallick et al. |
| 2020/0204495 | A1 | 6/2020 | Mallick et al. |
| 2020/0213274 | A1 | 7/2020 | Pusalkar et al. |
| 2020/0241890 | A1 | 7/2020 | Mallick et al. |
| 2020/0314218 | A1 | 10/2020 | Kumar et al. |
| 2020/0348860 | A1 | 11/2020 | Mallick et al. |
| 2020/0348861 | A1 | 11/2020 | Marappan et al. |
| 2020/0348869 | A1 | 11/2020 | Gokam |
| 2020/0349094 | A1 | 11/2020 | Smith et al. |
| 2020/0363985 | A1 | 11/2020 | Gokam et al. |
| 2020/0372401 | A1 | 11/2020 | Mallick et al. |
| 2021/0019054 | A1 | 1/2021 | Anchi et al. |
| 2021/0026551 | A1 | 1/2021 | Tidke et al. |
| 2021/0026650 | A1 | 1/2021 | Rao et al. |
| 2021/0157502 | A1 | 5/2021 | Rao et al. |
| 2021/0181965 | A1 | 6/2021 | Anchi et al. |
| 2023/0054272 | A1 * | 2/2023 | Trivedi ................... H04L 47/22 |

FOREIGN PATENT DOCUMENTS

| | | | |
|---|---|---|---|
| EP | 2354995 | A1 | 8/2011 |
| EP | 2667569 | A1 | 11/2013 |
| WO | 2011037720 | A1 | 3/2011 |

OTHER PUBLICATIONS

International Search Report and Written Opinion of PCT/US2019/053204 dated Dec. 16, 2019, 40 pages.

International Search Report and Written Opinion of PCT/US2019/053473 dated Dec. 19, 2019, 16 pages.

International Search Report and Written Opinion of PCT/US2019/067144 dated May 4, 2020, 26 pages.

Kris Piepho, "Dell EMC SC Series Storage: Microsoft Multipath I/O," Dell EMC Best Practices, Jan. 2017, 57 pages.

NVM Express, "NVM Express, Revision 1.3," NVM Express, May 1, 2017, 282 pages.

VMware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

(56) References Cited

OTHER PUBLICATIONS

VMware, Inc. "VMware VMFS Volume Management," 2009, 8 pages.
Dell EMC, "Dell EMC Unity: Virtualization Integration," Technical White Paper, Oct. 2019, 39 pages.
Dell EMC, "Dell EMC PowerMax: iSCSI Implementation for Dell EMC Storage Arrays Running PowerMaxOS," Technical White Paper, Sep. 2019, 35 pages.
NVM Express, "NVM Express Base Specification, Revision 2.0a," NVM Express, Jul. 23, 2021, 454 pages.
NVM Express, "NVM Express Base Specification, Revision 2.0b," NVM Express, Jan. 6, 2022, 455 pages.

* cited by examiner

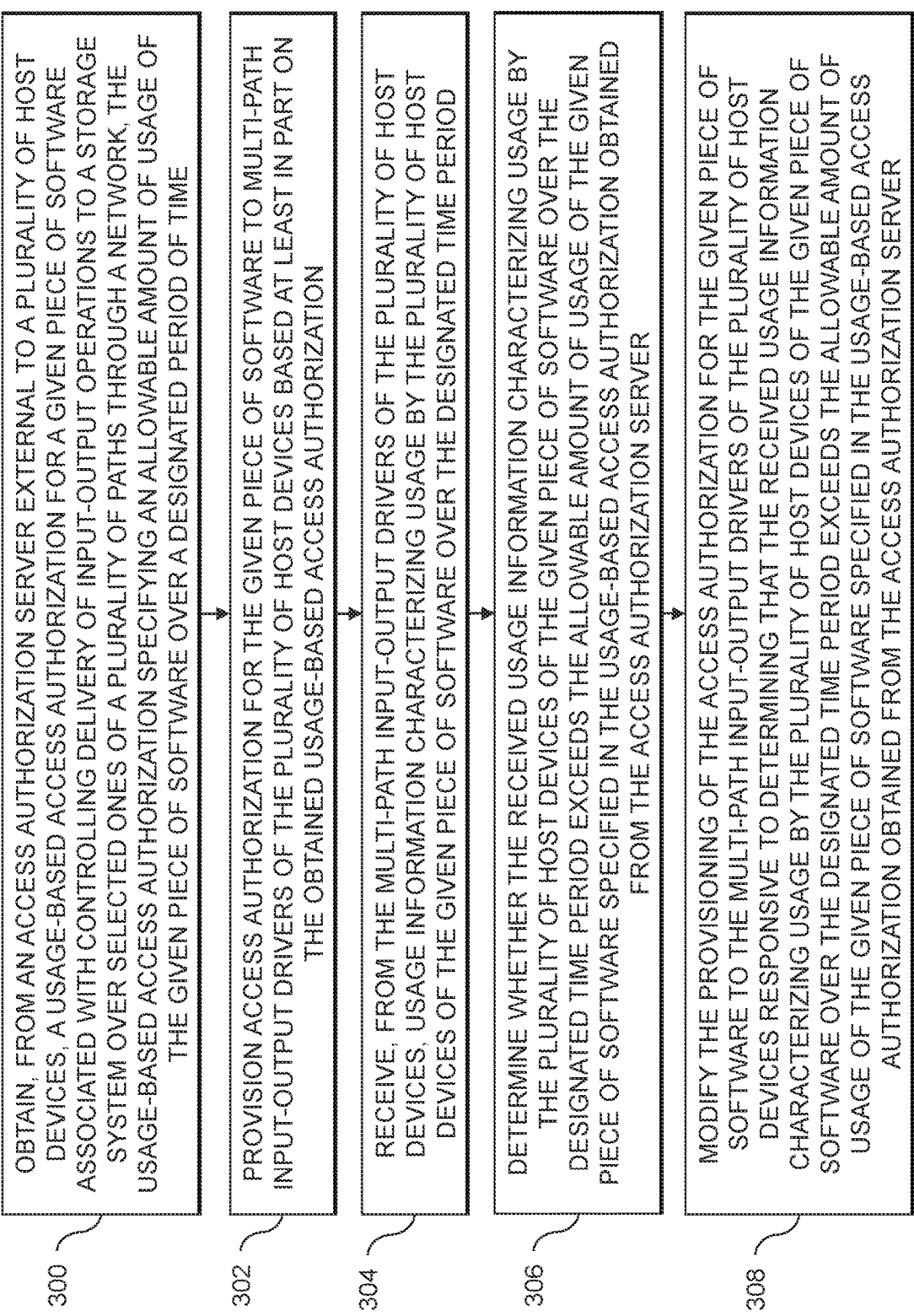

300 — OBTAIN, FROM AN ACCESS AUTHORIZATION SERVER EXTERNAL TO A PLURALITY OF HOST DEVICES, A USAGE-BASED ACCESS AUTHORIZATION FOR A GIVEN PIECE OF SOFTWARE ASSOCIATED WITH CONTROLLING DELIVERY OF INPUT-OUTPUT OPERATIONS TO A STORAGE SYSTEM OVER SELECTED ONES OF A PLURALITY OF PATHS THROUGH A NETWORK, THE USAGE-BASED ACCESS AUTHORIZATION SPECIFYING AN ALLOWABLE AMOUNT OF USAGE OF THE GIVEN PIECE OF SOFTWARE OVER A DESIGNATED PERIOD OF TIME

302 — PROVISION ACCESS AUTHORIZATION FOR THE GIVEN PIECE OF SOFTWARE TO MULTI-PATH INPUT-OUTPUT DRIVERS OF THE PLURALITY OF HOST DEVICES BASED AT LEAST IN PART ON THE OBTAINED USAGE-BASED ACCESS AUTHORIZATION

304 — RECEIVE, FROM THE MULTI-PATH INPUT-OUTPUT DRIVERS OF THE PLURALITY OF HOST DEVICES, USAGE INFORMATION CHARACTERIZING USAGE BY THE PLURALITY OF HOST DEVICES OF THE GIVEN PIECE OF SOFTWARE OVER THE DESIGNATED TIME PERIOD

306 — DETERMINE WHETHER THE RECEIVED USAGE INFORMATION CHARACTERIZING USAGE BY THE PLURALITY OF HOST DEVICES OF THE GIVEN PIECE OF SOFTWARE OVER THE DESIGNATED TIME PERIOD EXCEEDS THE ALLOWABLE AMOUNT OF USAGE OF THE GIVEN PIECE OF SOFTWARE SPECIFIED IN THE USAGE-BASED ACCESS AUTHORIZATION OBTAINED FROM THE ACCESS AUTHORIZATION SERVER

308 — MODIFY THE PROVISIONING OF THE ACCESS AUTHORIZATION FOR THE GIVEN PIECE OF SOFTWARE TO THE MULTI-PATH INPUT-OUTPUT DRIVERS OF THE PLURALITY OF HOST DEVICES RESPONSIVE TO DETERMINING THAT THE RECEIVED USAGE INFORMATION CHARACTERIZING USAGE BY THE PLURALITY OF HOST DEVICES OF THE GIVEN PIECE OF SOFTWARE OVER THE DESIGNATED TIME PERIOD EXCEEDS THE ALLOWABLE AMOUNT OF USAGE OF THE GIVEN PIECE OF SOFTWARE SPECIFIED IN THE USAGE-BASED ACCESS AUTHORIZATION OBTAINED FROM THE ACCESS AUTHORIZATION SERVER

FIG. 3

USAGE-BASED ACCESS AUTHORIZATION FOR SOFTWARE CODE OF MULTI-PATH INPUT-OUTPUT DRIVERS

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. Various types of storage access protocols can be used by host devices to access the logical storage volumes or other logical storage devices of the storage system, including by way of example Small Computer System Interface (SCSI) access protocols and Non-Volatile Memory Express (NVMe) access protocols.

SUMMARY

Illustrative embodiments of the present disclosure provide techniques for usage-based access authorization for software code of multi-path input-output drivers utilizing a multi-path layer of an information processing system.

In one embodiment, an apparatus comprises at least one processing device comprising a processor coupled to a memory. The at least one processing device is configured to perform the step of obtaining, from an access authorization server external to a plurality of host devices, a usage-based access authorization for a given piece of software associated with controlling delivery of input-output operations to a storage system over selected ones of a plurality of paths through a network, the usage-based access authorization specifying an allowable amount of usage of the given piece of software over a designated period of time. The at least one processing device is also configured to perform the steps of provisioning access authorization for the given piece of software to multi-path input-output drivers of the plurality of host devices based at least in part on the obtained usage-based access authorization, receiving, from the multi-path input-output drivers of the plurality of host devices, usage information characterizing usage by the plurality of host devices of the given piece of software over the designated time period, and determining whether the received usage information characterizing usage by the plurality of host devices of the given piece of software over the designated time period exceeds the allowable amount of usage of the given piece of software specified in the usage-based access authorization obtained from the access authorization server. The at least one processing device is further configured to perform the step of modifying the provisioning of the access authorization for the given piece of software to the multi-path input-output drivers of the plurality of host devices responsive to determining that the received usage information characterizing usage by the plurality of host devices of the given piece of software over the designated time period exceeds the allowable amount of usage of the given piece of software specified in the usage-based access authorization obtained from the access authorization server.

These and other illustrative embodiments include, without limitation, methods, apparatus, networks, systems and processor-readable storage media.

BRIEF DESCRIPTION OF THE DRAWINGS

FIG. 3 is a flow diagram of an exemplary process for performing usage-based access authorization for software code of multi-path input-output drivers in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
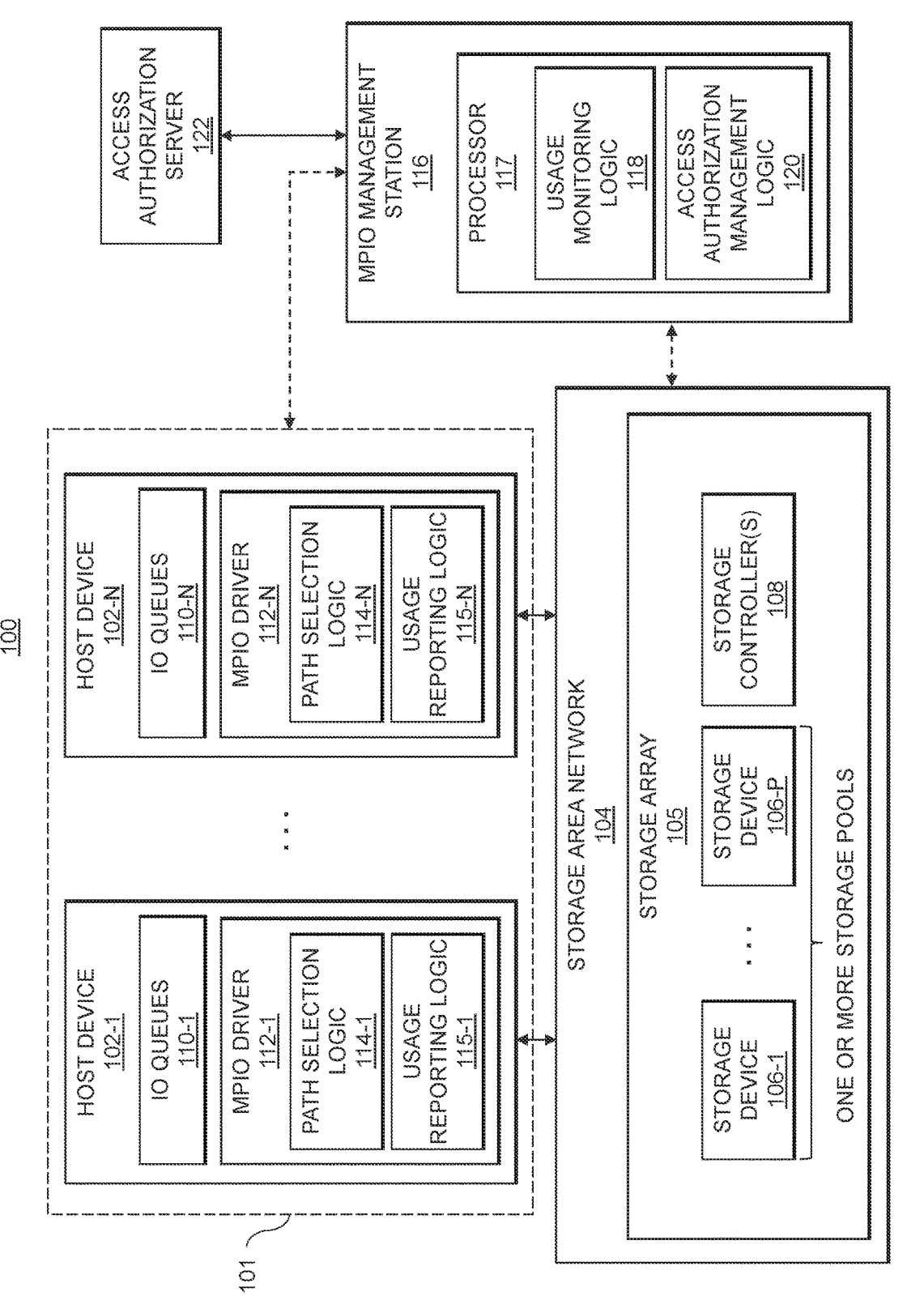
FIG. 1 is a block diagram of an information processing system configured for providing usage-based access authorization for software code for multi-path input-output drivers in an illustrative embodiment.

FIG. 1 shows an information processing system 100 configured in accordance with an illustrative embodiment. The information processing system 100 comprises a computer system 101 illustratively comprising a plurality of host devices 102-1, . . . 102-N (collectively, host devices 102), where N is an integer greater than or equal to two. The host devices 102 communicate over a storage area network (SAN) 104 with at least one storage array 105. The storage array 105 comprises a plurality of storage devices 106-1, . . . 106-P (collectively, storage devices 106) each storing data utilized by one or more applications running on one or more of the host devices 102, where P is also an integer greater than or equal to two. The storage devices 106 are illustratively arranged in one or more storage pools.

The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands of a SCSI access protocol and/or Non-Volatile Memory Express (NVMe) commands of an NVMe access protocol, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand (IB), Gigabit Ethernet or Fibre Channel (FC). Numerous alternative networking arrangements are possible in a given embodiment, as will be appreciated by those skilled in the art.

The host devices 102 comprise respective sets of IO queues 110-1, . . . 110-N (collectively, IO queues 110) and respective MPIO drivers 112-1, . . . 112-N (collectively, MPIO drivers 112). The MPIO drivers 112 collectively comprise a multi-path layer of the host devices 102. Path selection functionality for delivery of IO operations from the host devices 102 to the storage array 105 is provided in the multi-path layer by respective instances of path selection logic 114-1, . . . 114-N (collectively, path selection logic 114) implemented within the MPIO drivers 112.

The MPIO drivers 112 may comprise, for example, otherwise conventional MPIO drivers, such as PowerPath® drivers from Dell Technologies, suitably modified in the manner disclosed herein to provide functionality for dynamic control of one or more path selection algorithms. Other types of MPIO drivers from other driver vendors may be suitably modified to incorporate functionality for dynamic control of one or more path selection algorithms as disclosed herein.

The term "MPIO driver" as used herein is intended to be broadly construed, and such a component is illustratively implemented at least in part as a combination of software and hardware. For example, one or more of the MPIO drivers 112 can comprise one or more software programs running on a hardware processor of one or more of the host devices 102.

The host devices 102 can include additional or alternative components. For example, in some embodiments, the host devices 102 comprise respective local caches, implemented using respective memories of those host devices. A given such local cache can be implemented using one or more cache cards, possibly implementing caching techniques such as those disclosed in U.S. Pat. Nos. 9,201,803, 9,430,368 and 9,672,160, each entitled "System and Method for Caching Data," and incorporated by reference herein. A wide variety of different caching techniques can be used in other embodiments, as will be appreciated by those skilled in the art. Other examples of memories of the respective host devices 102 that may be utilized to provide local caches include one or more memory cards or other memory devices, such as, for example, an NVMe over PCIe cache card, a local flash drive or other type of NVM storage drive, or combinations of these and other host memory devices.

The system 100 further comprises an MPIO management station 116 that includes a processor 117 implementing usage monitoring logic 118 and access authorization management logic 120. The MPIO management station 116 is configured to communicate with the host devices 102 and the storage array 105. For example, each of the MPIO drivers 112 of the host devices 102 may implement an instance of usage reporting logic 115-1, . . . 115-N (collectively, usage reporting logic 115). The usage reporting logic 115 is configured to report, to the MPIO management station 116, information characterizing usage of software code by the different host devices 102 (e.g., usage by the different host devices 102 of software code of the MPIO drivers 112 or portions or features thereof, such as the path selection logic 114, etc.). In some embodiments, the usage information comprises an amount of data or a size of IO operations which are transferred between the host devices 102 and the storage array 105, possibly broken down by LUN. The MPIO management station 116 utilizes the usage monitoring logic 118 to monitor usage across the host devices 102, based on the usage information reported via the usage reporting logic 115. The access authorization management logic 120 controls access authorization for the MPIO drivers 112 (or portions or features thereof, such as the path selection logic 114) based on the monitored usage across the host devices 102 and a usage-based subscription obtained from an external access authorization server 122 as described in further detail below.

Communication between the MPIO drivers 112 and the MPIO management station 116 may utilize one or more representational state transfer (REST) application programming interfaces (APIs) of the MPIO drivers 112. The MPIO management station 116 provides management functionality for the multi-path layer comprising the MPIO drivers 112 of the host devices 102. In some embodiments, host device management software executing on the MPIO management station 116 interacts with storage array management software executing on the storage array 105. The MPIO management station 116, or portions thereof, may be considered in some embodiments as forming part of what is referred to herein as a "multi-path layer" that includes the MPIO drivers 112 of the host devices 102. The term "multi-path layer" as used herein is intended to be broadly construed and may comprise, for example, an MPIO layer or other multi-path software layer of a software stack, or more generally multi-pathing software program code, running on one or more processing devices each comprising at least one processor and at least one memory.

The MPIO management station 116 is an example of what is more generally referred to herein as an "external server"

relative to the storage array 105. Additional or alternative external servers of different types can be used in other embodiments.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

A given IO operation is therefore illustratively generated by a process of an application running on the host device 102-1, and is queued in a given one of the IO queues 110-1 of the host device 102-1 with other operations generated by other processes of that application, and possibly other processes of other applications.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value. A negotiated link speed is an example of what is more generally referred to herein as a "negotiated rate."

The negotiated rates of the respective initiator and target of a particular one of the paths illustratively comprise respective negotiated data rates determined by execution of at least one link negotiation protocol for that path. The link negotiation protocol is illustratively performed separately by the initiator and the target, and involves each such component separately interacting with at least one switch of a switch fabric of the SAN 104 in order to determine the negotiated rate. The term "negotiated rate" therefore illustratively comprises a rate negotiated between an initiator or a target and a switch of a switch fabric of the SAN 104. However, the term "negotiated rate" as used herein is intended to be broadly construed so as to also encompass, for example, arrangements that refer to negotiated speeds. Any of a wide variety of different link negotiation protocols can be used, including auto-negotiation protocols, as will be readily appreciated by those skilled in the art.

For example, some embodiments are configured to utilize link negotiation protocols that allow negotiation of data rates such as 1G, 2G, 4G, 8G, 16G, 32G, etc., where G denotes Gigabits per second (Gb/sec). The link bandwidth is illustratively specified in terms of Megabytes per second (MB/sec), and the actual amount of data that can be sent over the link in practice is typically somewhat lower than the negotiated data rate. Accordingly, a negotiated rate of 1G in some systems may correspond to an actual achievable data rate that is lower than 100 MB/sec, such as a rate of 85 MB/sec.

The term "negotiated rate" as used herein is therefore intended to be broadly construed, so as to encompass, for example, a theoretical negotiated rate or an actual achievable data rate that corresponds to the theoretical negotiated rate within a given system.

It is also to be appreciated that a wide variety of other types of rate negotiation may be performed in other embodiments.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible. The user-space portion of the MPIO driver 112-1 is illustratively associated with an Operating System (OS) kernel of the host device 102-1. Other MPIO driver arrangements are possible. For example, in some embodiments, an MPIO driver may be configured using a kernel-based implementation, and in such an arrangement may include only a kernel-space portion and no user-space portion.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

The MPIO driver 112-1 is further configured to determine IO processing performance for each of at least a subset of the paths, and to dynamically adjust a path selection algorithm, utilized by the path selection logic 114-1 in selecting particular ones of the paths for delivery of the IO operations from the host device 102-1 to the storage array 105, based at least in part on the determined performance.

In determining IO processing performance of respective paths, the MPIO driver 112-1 obtains information such as, for example, response times or other latency measures of the respective paths. This information is illustratively referred to in the context of some embodiments herein as "path condition information," although other types of information can be used in other embodiments. Dynamic control of one or more path selection algorithms is therefore performed in some embodiments using latency measures.

The above-noted process of determining IO processing performance for each of at least a subset of the paths and dynamically adjusting a path selection algorithm utilized in selecting particular ones of the paths for delivery of the IO operations from the host device to the storage array 105 based at least in part on the determined performance is illustratively repeated in each of a plurality of intervals. The particular duration of such time periods can be a user-configurable parameter, or set by default, and can vary depending upon factors such as the desired resolution of the IO processing performance information and the amount of overhead required to determine that information.

In the FIG. 1 embodiment, the storage array 105 comprises one or more storage controllers 108. The storage controllers 108 may maintain per-port IO processing information. Such per-port IO processing information is illustratively collected by the storage array 105, and in some embodiments may be provided to one or more of the host devices 102 for use in conjunction with path selection.

The MPIO management station 116 is arranged as an intermediary device relative to the host devices 102 and the storage array 105. Some communications between the host devices 102 and the storage array 105 can occur via such an intermediary device, which as indicated elsewhere herein can alternatively comprise one or more external servers. Such communications illustratively involve utilization of an out-of-band communication mechanism, such as one or more IP connections between the host devices 102 and the MPIO management station 116.

As indicated previously, the host devices 102 communicate directly with the storage array 105 using one or more storage access protocols such as SCSI, Internet SCSI (iSCSI), SCSI over FC (SCSI-FC), NVMe over FC (NVMe/ FC), NVMe over Fabrics (NVMeF), NVMe over TCP (NVMe/TCP), and/or others. The MPIO management station 116 in some embodiments is similarly configured to communicate directly with the storage array 105 using one or more such storage access protocols.

The MPIO driver 112-1 on the host device 102-1 illustratively has connectivity to the MPIO management station 116. The MPIO management station 116 in some embodiments implements PowerPath® Management Appliance (PPMA) functionality to obtain access to the storage array 105. The MPIO driver 112-1 can obtain from the MPIO management station 116 certain types of storage array related information for use in various operations performed at least in part by the MPIO driver 112-1, in addition to or in place of obtaining such information directly from the storage array 105. Host multi-pathing software can be used to implement a multi-path layer comprising MPIO drivers 112 of respective host devices 102 as well as related management appliance software such as the above-noted PPMA of MPIO management station 116. Such host multi-pathing software can be configured to facilitate logical storage device access as disclosed herein.

It should be noted that various logic components (e.g., path selection logic 114, usage reporting logic 115, usage monitoring logic 118, access authorization management logic 120, etc.) disclosed herein can include various combinations of hardware, firmware and software. The term "logic" as used herein is therefore intended to be broadly construed.

As indicated above, at least portions of the communications between the host devices 102 and the storage array 105 can utilize an in-band communication mechanism in which one or more predetermined commands in a designated storage access protocol are sent from the host device 102-1 to the storage array 105. Such predetermined commands can comprise, for example, read and/or write commands, sense commands (e.g., log sense and/or mode sense commands), "vendor unique" or VU commands, or combinations of multiple instances of these or other commands, in an otherwise standardized command format, such as a SCSI format, an NVMe format, or other type of format. A "command" as the term is broadly used herein can comprise a combination of multiple distinct commands.

It is also possible for the host devices 102 and the storage array 105 to communicate via one or more out-of-band communication mechanisms. For example, an out-of-band communication mechanism of this type can involve host management software of the host device 102-1 communicating with storage array management software of the storage array 105 over an IP network connection or other type of network connection. Such host management software can include software running on the MPIO management station 116, in addition to or in place of software running on the individual host devices 102.

Additional components not explicitly shown in the figure, such as one or more storage caches, may also be provided in the storage array 105 for use in processing IO operations. For example, in some embodiments, each of the storage controllers 108 has a different local cache or a different allocated portion of a global cache associated therewith, although numerous alternative arrangements are possible. The storage controllers 108 can be implemented as respective storage processors, directors or other storage system components configured to control storage system operations relating to processing of IO operations.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104.

Accordingly, functionality described above in the context of the first MPIO driver 112-1 and the first host device 102-1 is assumed to be similarly performed by each of the other MPIO drivers 112 and/or more generally by their respective host devices 102.

The MPIO drivers 112 may be otherwise configured utilizing well-known multi-pathing functionality. Such conventional multi-pathing functionality is suitably modified in illustrative embodiments disclosed herein to support access authorization for at least a portion of software code of the MPIO driver 112.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVMe, as described in the NVMe Base Specification, Revision 2.0b, Jan. 6, 2022, which is incorporated by reference herein. Other NVMe storage access protocols of this type that may be utilized in illustrative embodiments disclosed herein include NVMe/FC, NVMeoF and NVMe/TCP.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage array 105 in the present embodiment may comprise additional components not explicitly shown in the figure, such as a response time control module and IO operation priority queues, illustratively configured to make use of the above-described persistent memory. For example, the response time control module may be used to implement storage array based adjustments in response time for particular IO operations based at least in part on service level objective (SLO) information stored by the storage array 105 in its persistent memory. The response time control module is assumed to operate in conjunction with the above-noted IO operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105. Process tags may be used in assigning different ones of the IO operations to different ones of the IO operation priority queues, as disclosed in U.S. Pat. No. 10,474,367, entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system. Such a cloud-based system can additionally or alternatively be used to implement other portions of system 100, such as the host devices 102 and the MPIO management station 116.

The storage devices 106 of the storage array 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more PowerMax™ storage arrays, commercially available from Dell Technologies. Numerous other types of storage arrays can be used in other embodiments.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

Additional examples of processing platforms utilized to implement portions of the system 100 in illustrative embodiments will be described in more detail below in conjunction with FIGS. 4 and 5.

Access authorization for software code of MPIO drivers 112 can be a challenging task. Such access authorization may include, for example product licensing for software products such as the MPIO driver 112 or features thereof (e.g., path selection logic 114). For example, standalone software running on the host devices 102 for implementing the path selection logic 114 may rely on access authorization keys or credentials (e.g., license keys), issued by the access authorization server 122 (e.g., an electronic license management server (ELMS) or other type of license server), that are stored or saved in the host devices 102. Such an access authorization approach, however, can be compromised through reverse engineering the access authorization model utilized by the access authorization server 122 (e.g., an electronic licensing model used by an ELMS). An access authorization model, such as an electronic licensing model, may be used to restrict a particular access authorization credential (e.g., a license) to a specific one of the host devices 102, to specific software on one of the host devices 102 (e.g., to software for implementing path selection logic 114), to specific features of software on one of the host devices 102, etc. In some access authorization models, the access authorization server 122 may generate host access authorization credentials (e.g., host licenses) based on unique identifiers of the host devices 102. The unique identifier of a given one of the host devices 102 may, in some cases, be based on hardware or other characteristics of that host device. Thus, each time one of the host devices 102 is re-imaged, the host access authorization credential for that host device must be re-generated. Also, in such an access authorization model the same host access authorization credential cannot be shared across multiple ones of the host devices 102 or across platforms, as the host access authorization credentials are assumed to be tied to the unique identifiers of the host devices 102. Further, upgrades of the access authorization server 122 in such an access authorization model may cause disruption to the host devices 102

(e.g., to access authorization or licensing modules resident thereon that support such an access authorization or licensing model). When the host devices 102 are production hosts that deploy and host live functionality, such disruption can significantly affect performance.

Various types of access authorization models may be used, including various types of electronic licensing models. The "served" license model is an application-based license model which is defined according to the license server that manages the allocation of licenses. The served license model is dependent on the availability of the license server, and if the license server goes down the license will be released to a license pool. The "unserved" license model is a host-based license model, in which the physical address or other characteristics of host devices are used to generate host-specific licenses prior to use. In a "classic" license model, features of software or another type of product are encrypted and the license is stored as license keys in host devices. The license key can be used for multiple installations of the software or other product. The drawback of such licensing models is that, when licensing enhancement is done, licensing modules resident in host devices have to be updated along with the software or other product in the host devices. This causes significant disruption, particularly where the host devices are production hosts. Another drawback of such licensing models is that licenses cannot generally be shared across different ones of the host devices and across different platforms used by different ones of the host devices. Further, such licensing models are deficient in that license renewal may not be regularly enforced thus allowing license tampering. Generally, upgrade of a licensing server causes disruption to licensing modules running in production hosts.

In various conventional electronic licensing models or other types of access authorization models, license keys or other access authorization credentials are stored inside production hosts. Such models, however, are exploitable through license or access authorization credential leakage. After a "linger" period, a license or other access authorization server (e.g., access authorization server 122) releases a license or other access authorization credential assigned to a host, even though that license or other access authorization credential may still be in use until the host is rebooted. Further, conventional licensing or other types of access authorization models require tight coupling, requiring an active communication link between the license or other access authorization server and the hosts. If communication is lost or disrupted between the license or other access authorization server and a host (e.g., after license or other access authorization credential acquisition by the host), then the license or other access authorization credential will be released.

Illustrative embodiments provide technical solutions which support usage-based access authorization (e.g., licensing) of multipathing software (e.g., MPIO drivers 112, components or features thereof such as path selection logic 114, etc.) that is exposed in accordance with an "as-a-service" model. The technical solutions described herein provide various improvements relative to conventional access authorization or licensing approaches, which utilize host-based licensing or array-specific key-based licensing as described above which suffer from various technical problems related to access authorization wastage, access authorization leakage, and tight coupling. License wastage may be a result of a customer or other user purchasing access authorizations (e.g., licenses) in advance, where the user may not end up consuming all of the access authorizations which were purchased. Access authorization leakage may be a result of vulnerabilities in access authorization models where a key is stored inside hosts, where the keys may be exploited. Further, after a "linger" period an access authorization server may release an access authorization, even if that access authorization is still in use by a host until the host is rebooted. As noted above, tight coupling is a result of access authorization models which require active communication between hosts and an access authorization server, where if such communication is lost access authorization is released.

In some embodiments, a web application is deployed at a data center which will act as a centralized access authorization (e.g., license) server, where the web application is assumed to have connectivity to all multipathing software-enabled hosts in the data center. In the context of FIG. 1, the web application may be deployed in the MPIO management station 116 as the usage monitoring logic 118 and access authorization management logic 120, where the MPIO management station 116 has connectivity to the MPIO drivers 112 running on the host devices 102. At regular intervals, each of the host devices 102 will report usage information to the MPIO management station 116 via respective instances of the usage reporting logic 115 running on the MPIO drivers 112. In some embodiments, the usage information comprises read/write data usage (e.g., for IO operations between the host devices 102 and the storage array 105 which are performed utilizing the MPIO drivers 112). The usage data may also be reported to a backend server operating outside the data center (e.g., access authorization server 122), where the backend server is associated with a vendor of the MPIO drivers 112. In some embodiments, the usage information may be communicated via support software which runs on the host devices 102, such as Secure Remote Services (SRS) support software.

In some embodiments, a user or operator of the host devices 102 in a data center obtains a usage-based multipathing software access authorization subscription (e.g., a usage-based license subscription) from a vendor. This may involve utilizing a self-service catalog provided via a Dell APEX console. Here, the access authorization subscription is not host-based, it is usage-based. The user, for example, may subscribe for some monthly (or daily, weekly, yearly, etc.) multipathing data usage. The multipathing access authorization may comprise separate subscription models for virtual computing environments and physical computing environments, or a single subscription model may be used for both virtual and physical computing environments. The user then attaches host devices 102 to the MPIO management station 116 (e.g., providing a centralized access authorization server) which acts as an access authorization orchestrator for the multipathing environment. The MPIO management station 116, as described elsewhere herein, runs on a different "external" server relative to the production host devices 102. The MPIO management station 116 acts as an orchestration which runs between an external access authorization server 122 and the multipathing software (e.g., MPIO drivers 112, features thereof such as path selection logic 114) running on the production host devices 102, and coordinates access authorization as per actual usage by the host devices 102 of the multipathing software in a data center. Each of the host devices 102 attached to the MPIO management station 116 will be licensed by default. The multipathing software running on the host devices 102, using the usage reporting logic 115, will calculate usage information (e.g., performance read/write data for each LUN) and uses an agent to report the usage information to the MPIO management station 116 on a periodic basis.

The MPIO management station 116, via the usage monitoring logic 118, will consolidate the usage information across the host devices 102 in the data center. In some cases, the usage information is separated based on the type of host (e.g., physical or virtual computing environment), and possibly based on other factors (e.g., such as operating system (OS) used). The overall usage information is then sent back to the access authorization server 122 (e.g., through secure remote services) to calculate access authorization usage. The overall usage information may be reported to the access authorization server 122 periodically (e.g., daily, weekly, etc.). In some cases, the interval at which the host devices 102 report usage information to the MPIO management station 116 is aligned with the interval at which the MPIO management station 116 reports overall usage information to the access authorization server 122. For example, the host devices 102 may be configured to report usage information to the MPIO management station 116 daily at 9:00 AM, with the MPIO management station 116 reporting the overall usage information to the access authorization server 122 daily at 10:00 AM. Various other examples are possible. From the initial subscription, the daily usage limit will be reduced based on the subscription model. It should be noted that reporting of the overall usage information from the MPIO management station 116 to the access authorization server 122 is not required. Further, certain ones of the host devices 102 may be configured with specific types of access authorization (e.g., where access authorization for multipathing software is bundled with access authorization for other software), and for such host devices 102 the usage information may still be collected but is not sent to the access authorization server 122 for usage-based consumption calculation.

The MPIO management station 116, as noted above, implements access authorization management logic 120 that is configured to manage usage-based access authorization for the MPIO drivers 112 of the host devices 102. The host devices 102 are assumed to comprise production hosts in a data center or other enterprise system, with associated MPIO drivers 112 hosting live functionality (e.g., of path selection logic 114). The host devices 102 are thus also referred to herein as production hosts 102. The access authorization management logic 120 may also be referred to herein as an access authorization or license supervisor, or as an access authorization proxy server or proxy license server.

The access authorization management logic 120 implemented by the MPIO management station 116 runs between the access authorization server 122 and software (e.g., MPIO drivers 112) in the production hosts 102, to coordinate usage-based access authorization (e.g., licenses) for software code used across the production hosts 102. Therefore, the access authorization management logic 120 runs on an external server (e.g., the MPIO management station 116) different than the production hosts 102. The access authorization management logic 120 may be configured with a subscribed usage amount, and controls access authorization for the production hosts 102 in accordance with the subscribed usage amount. For example, a user may subscribe for 10 terabytes (TB) of data usage for IO operations performed between the host devices 102 and the storage array 105 in a data center. The host devices 102, via the usage reporting logic 115 running on the MPIO drivers 112, will report actual performance read/write data usage to the MPIO management station 116 at regular intervals. The MPIO management station 116, via the usage monitoring logic 118, will determine the overall usage by the production hosts 102, and will then control access authorization, via the access authorization management logic 120, based on a comparison of the actual overall usage by the production hosts 102 and the subscribed usage.

The MPIO management station 116 may store various information relating to usage-based license or access authorization subscriptions, usage information, etc. in a host database. Such a host database may be implemented internal to the MPIO management station 116, or may be implemented at least partially external to the MPIO management station 116. The host database may be any type of database or other data store configured to store such information.

Although not explicitly shown in FIG. 1, one or more input-output devices such as keyboards, displays or other types of input-output devices may be used to support one or more user interfaces to the MPIO management station 116, as well as to support communication between the MPIO management station 116 and other related systems and devices not explicitly shown.

The production hosts 102 may persist license or other access authorization credential information provided by the access authorization management logic 120 of the MPIO management station 116 in a kernel space or process memory (e.g., to avoid user accessibility and thus avoid license or other access authorization credential leakage) of the MPIO drivers 112 of the production hosts 102. When software on the production hosts 102 is being utilized, such software may access the kernel space or process memory to determine whether the production hosts 102 have been licensed or otherwise have access authorization from the MPIO management station 116 to use such software. In some embodiments, the MPIO management station 116 sets a license or other access authorization status in the kernel space or process memory as a Boolean (e.g., 1 if a given production host 102 is licensed or authorized, 0 otherwise) along with other license or other access authorization credential information such as license or other access authorization credential expiry, issue date, renewal date, etc. If a given one of the production hosts 102 determines that particular software is not licensed or authorized, that software may have its features restricted (e.g., a basic version of the software may be used, with some functionality locked or not enabled).

The access authorization management logic 120 is implemented by the MPIO management station 116, which is assumed to comprise a different physical or virtual computing device than the production hosts 102. The MPIO management station 116 and the access authorization management logic 120 runs between the access authorization server 122 and software (e.g., path selection logic 114) in the MPIO drivers 112 of the production hosts 102 to coordinate usage-based software or other product licensing or other access authorization across the production hosts 102 in the data center or other enterprise system.

The MPIO management station 116 is loaded or provisioned (e.g., by the access authorization server 122) with a subscription for some designated amount of usage for a particular piece of software (e.g., the path selection logic 114 running on the MPIO drivers 112 of the production hosts 102), and connects to the production hosts 102 for licensing or other access authorization. This model for host and software independent usage-based licensing or other access authorization enables usage-based licensing or other access authorization of any software or other product used by the MPIO drivers 112 of the production hosts 102 (e.g., not just the path selection logic 114), and more generally may be used to implement usage-based license or other access authorization for other software or products such as the MPIO drivers 112 themselves, or additional software or other products of the production hosts 102.

In some embodiments, the MPIO management station 116 (implementing the access authorization management logic 120) and the production hosts 102 (comprising the MPIO drivers 112) are on a "private" network of the data center or other enterprise system (e.g., that is not accessible by the access authorization server 122). The private network may be used to secure communications when the MPIO drivers 112 of the production hosts 102 and the access authorization management logic 120 implemented by the MPIO management station 116 initiate connections to perform licensing or other access authorization tasks (e.g., such as reporting usage information). It should be appreciated, however, that such a private network connection is not a requirement. In some cases, given the potentially large scale of production hosts 102 with MPIO drivers 112 having access authorization managed by the access authorization management logic 120 implemented by the MPIO management station 116, the costs of allocating a private network strictly for the purposes of such communication is prohibitive. Thus, an operator of the data center in which the production hosts 102 and MPIO management station 116 operate may desire an alternative for establishing trust between the production hosts 102 and MPIO management station 116 (e.g., between the MPIO drivers 112 and the access authorization management logic 120), such as by leveraging a secure protocol.

In some embodiments, the production hosts 102 and MPIO management station 116 share or utilize REST APIs for licensing or other access authorization tasks (e.g., including usage reporting) performed by the access authorization management logic 120. The access authorization management logic 120 is implemented on the MPIO management station 116 that resides in the same private network as the production hosts 102 that it manages.

It is to be appreciated that these and other features of illustrative embodiments are presented by way of example only, and should not be construed as limiting in any way. Accordingly, different numbers, types and arrangements of system components such as access authorization server 122, host devices 102, SAN 104, storage array 105, storage devices 106, sets of IO queues 110, MPIO drivers 112 (including their corresponding instances of path selection logic 114 and usage reporting logic 115), MPIO management station 116, processor 117, usage monitoring logic 118 and access authorization management logic 120, can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

Figure 2:
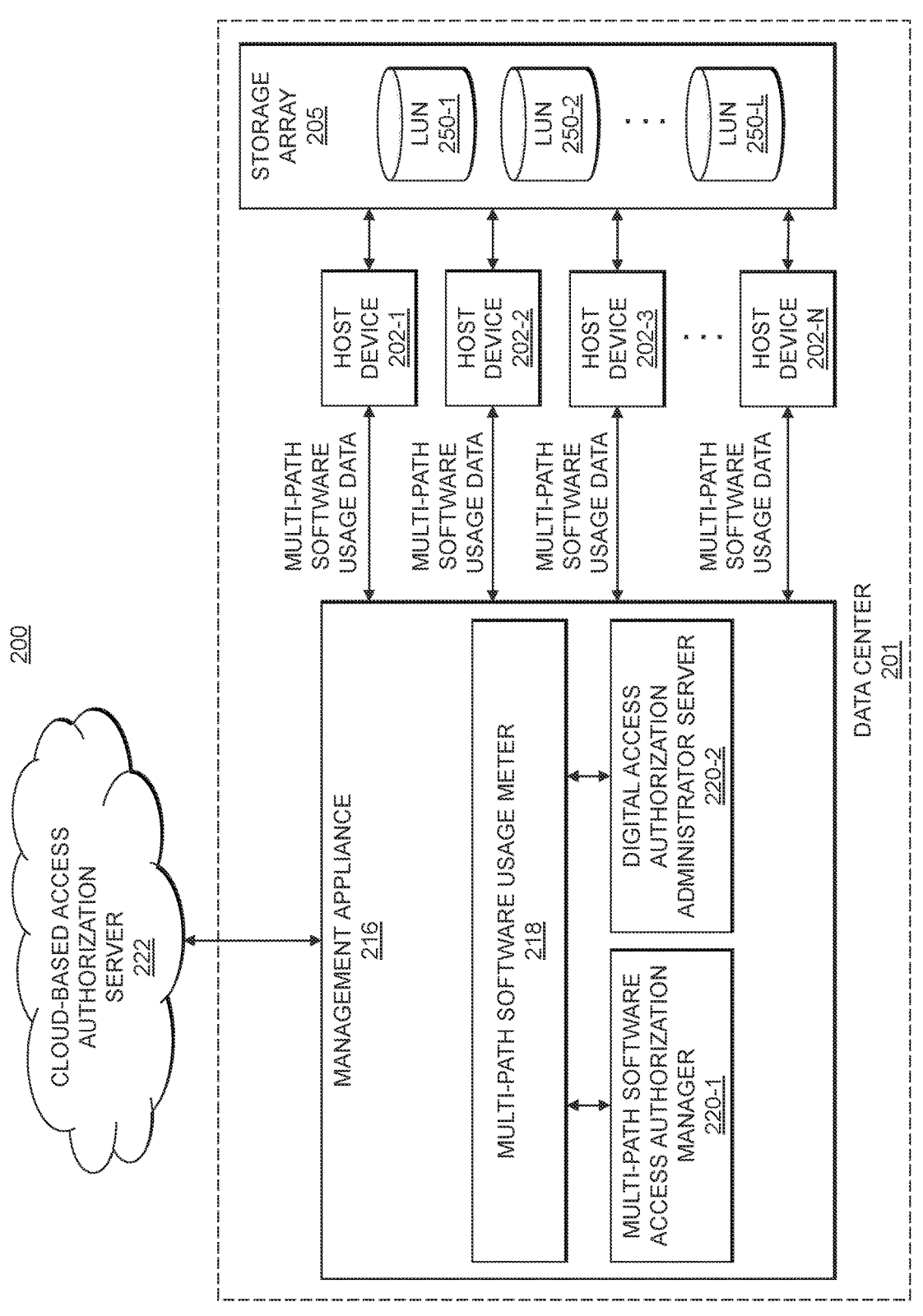
FIG. 2 is a system flow illustrating a process for performing usage-based access authorization for multi-path software running on host devices in an illustrative embodiment.

FIG. 2 illustrates a system 200 configured for usage-based access authorization, including a set of host devices 202-1, 202-2, 202-2, . . . 202-N (collectively, host devices 202) in a data center 201 which are coupled to a management appliance 216 (e.g., a PPMA). The host devices 202 may include various different types of hosts, including virtual hosts and physical hosts. Examples of virtual hosts include VMware® ESXi hosts and IBM® AIX hosts. Examples of physical hosts include physical machines running different OSes such as Windows and Linux OSes. The host devices 202 are assumed to access one or more LUNs 250-1, 250-2, . . . 250-L (collectively, LUNs 250) of a storage array 205 utilizing multi-pathing software which runs on the host devices 202. The management appliance 216 is further coupled to a cloud-based access authorization server 222 (e.g., a Dell APEX Cloud License Server). Here, the management appliance 216 implements a multi-path software usage meter 218, which is configured to collect multi-path software usage data from the host devices 202, and which optionally provides the collected multi-path software usage data to the cloud-based access authorization server 222. In some embodiments, the collected multi-path software usage data is broken down or associated with different ones of the LUNs 250 of the storage array 205.

The collected multi-path software usage data is used for determining access authorization for multi-path software running on the host devices 202 using a multi-path software access authorization manager 220-1 and a digital access authorization administrator server 220-2. The cloud-based access authorization server 222 may allow a user to subscribe for a usage-based license or access authorization for the multi-pathing software for the data center 201 collectively (e.g., for all host devices 102 running the multi-pathing software in the data center 201). In some embodiments, the usage-based license or access authorization is separated for different types of hosts (e.g., a first usage-based license or access authorization for physical hosts, a second usage-based license or access authorization for virtual hosts), or for different OSes (e.g., a first usage-based license or access authorization for hosts running a first OS, a second usage-based license or access authorization for hosts running a second OS, etc.). The usage-based license or access authorization may also be tied to one or more specific ones of the LUNs 250 of the storage array 205 (e.g., a first usage-based license or access authorization for LUN 250-1, a second usage-based license or access authorization for LUN 250-2, etc.). The cloud-based access authorization server 222 will provision the usage-based license(s) or access authorization(s) to the management appliance 216. The multi-path access authorization manager 220-1 will use the collected multi-path software usage data to determine access authorization status for the multi-path software running on the host devices 202, and the digital access authorization administrator server 220-2 will provision access authorization for the multi-path software running on the host devices 202 accordingly.

The technical solutions described herein advantageously provide usage-based access authorization for multi-path software, where the access authorization is calculated on a "pay-as-you-use" basis. With the technical solutions described herein, a customer or end-user can subscribe to a certain usage limit (e.g., amount of data transferred) with an access authorization server based on their needs. Consider, for example, a user which subscribes for 10 TB of usage for multi-path software. Storage arrays have mechanisms for figuring out and providing details of how much data has been transferred from host devices to the storage array. Conventional approaches, however, do not have array-agnostic mechanisms for determining the exact throughput usage between each host device and a storage array.

Conventional approaches for licensing or access authorization for multi-path software use a classic licensing model with static license keys or other access authorization credentials that can be used on any number of servers or host devices. The license or access authorization is given on a per-host basis. With the move towards cloud-based "as-a-service" offerings, using static key or electronic-based licensing may not be the most efficient approach. The technical solutions described herein provide usage-based access authorization for multi-path software which advantageously enables "multipathing-as-a-service" for storage environments. The technical solutions described herein do not require a public network connection between a proxy license or access authorization server (e.g., the MPIO management station 116 or management appliance 216) and production hosts (e.g., host devices 102 and 202). A private network connection is sufficient for providing socket communication between the proxy license or access authorization server and the production hosts. As there is no licensing module in the production hosts, this makes production hosts work independently of licensing or access authorization upgrades. Conventional approaches, in contrast, require licensing modules to be present in individual host devices. The proxy license or access authorization server also avoids the need for re-generating licenses or access authorizations related to host re-imaging. A usage-based license or access authorization can advantageously be shared across hosts, platforms and products. Further, since there is no license file there is no chance of license tampering.

An exemplary process for usage-based access authorization for software code of multi-path input-output drivers will now be described in more detail with reference to the flow diagram of FIG. 3. It is to be understood that this particular process is only an example, and that additional or alternative processes for usage-based access authorization for software code of multi-path input-output drivers may be used in other embodiments.

In this embodiment, the process includes steps 300 through 308. The FIG. 3 process is assumed to be performed by the MPIO management station 116 utilizing the usage monitoring logic 118 and the access authorization management logic 120. As noted above, the MPIO management station 116 may comprise a management appliance (e.g., a PPMA) configured to manage MPIO drivers 112 of the host devices 102 providing respective production hosts in a data center. Such management illustratively includes management of access authorization for a given piece of software that runs on the host devices 102. The given piece of software may include at least one or more portions of the MPIO drivers 112 themselves (e.g., such as the path selection logic 114 of the MPIO drivers 112). While in the FIG. 3 embodiment it is assumed that the given piece of software does not comprise the MPIO drivers 112 in their entirety, in other embodiments the given piece of software may comprise the MPIO drivers 112 in their entirety, or combinations of the MPIO drivers 112 in their entirety and one or more other drivers, applications or other types of software which run on the host devices 102. The given piece of software may alternatively not include any portion of the MPIO drivers 112 (e.g., the given piece of software may be one or more drivers, applications or other types of software running on the host devices 102 outside of the MPIO drivers 112). Numerous other arrangements are possible, and the term "a given piece of software" as used herein is therefore intended to be broadly construed.

The FIG. 3 process begins with step 300, obtaining, from the access authorization server 122 external to the host devices 102, a usage-based access authorization for a given piece of software associated with controlling delivery of IO operations to the storage array 105 over selected ones of a plurality of paths through the SAN 104. The usage-based access authorization specifies an allowable amount of usage of the given piece of software over a designated period of time. The obtained usage-based access authorization may be utilizable for provisioning access authorization to any number of the host devices 102 having MPIO drivers 112 managed by the MPIO management station 116. The obtained usage-based access authorization may be utilizable for provisioning access authorization independent of hardware and software platform configurations of the host devices 102. In some embodiments, the access authorization server 122 comprises a cloud-based license server which provisions use of the given piece of software in accordance with an as-a-service usage-based licensing model.

The allowable amount of usage of the given piece of software over the designated period of time may comprise a size of data transmitted between the host devices 102 and the storage array 105 utilizing the MPIO drivers 112. The allowable amount of usage of the given piece of software over the designated period of time may alternatively comprise a size of data transmitted between the host devices 102 and one or more LUNs of the storage array 105 utilizing the MPIO drivers 112.

In some embodiments, the allowable amount of usage of the given piece of software over the designated period of time comprises two or more allowable amounts of usage of the given piece of software over the designated period of time for two or more different types of the host devices 102. The two or more allowable amounts of usage may comprise a first allowable amount of usage for ones of the host devices 102 operating virtualized computing environments and a second allowable amount of usage for ones of the host devices 102 operating physical computing environments. The two or more allowable amounts of usage may comprise a first allowable amount of usage for ones of the host devices 102 running a first OS and a second allowable amount of usage for ones of the host devices 102 running a second OS different than the first OS. The allowable amount of usage of the given piece of software over the designated period of time may also or alternatively comprise two or more allowable amounts of usage of the given piece of software over the designated period of time for data exchanged between the host devices 102 and two or more different sets of LUNs of the storage array 105.

In step 302, access authorization for the given piece of software is provisioned to the MPIO drivers 112 of the host devices 102 based at least in part on the obtained usage-based access authorization. Usage information characterizing usage by the host devices 102 of the given piece of software over the designated time period is received from the MPIO drivers 112 of the host devices 102 in step 304. In step 306, a determination is made as to whether the received usage information characterizing usage by the host devices 102 of the given piece of software over the designated time period exceeds the allowable amount of usage of the given piece of software specified in the usage-based access authorization obtained from the access authorization server 122. The provisioning of the access authorization for the given piece of software to the MPIO drivers 112 of the host devices 102 is modified in step 308 responsive to determining that the received usage information characterizing usage by the host devices 102 of the given piece of software over the designated time period exceeds the allowable amount of usage of the given piece of software specified in the usage-based access authorization obtained from the access authorization server 122.

The FIG. 3 process may further include providing, to the access authorization server 122, overall usage information characterizing usage of the given piece of software by the host devices 102 collectively over the designated time period. This step, along with steps 304, 306 and 308, may be performed periodically during the designated time period such that a remaining amount of the allowable amount of usage of the given piece of software may be tracked during the designated time period. Alerts of notifications may be generated and provided to one or more operators of a data center in which the host devices 102 operate in the event that the remaining amount of the allowable amount of usage of the given piece of software falls below some threshold level, or if the allowable amount of usage of the given piece of software is predicted to be used up prior to the expiration of the designated period of time based on tracking the overall usage of the given piece of software across the multiple periodic intervals during the designated time period.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for usage-based access authorization for software code of multi-path input-output drivers will now be described in greater detail with reference to FIGS. 4 and 5. Although described in the context of system 100, these platforms may also be used to implement at least portions of other information processing systems in other embodiments.

Figure 4:
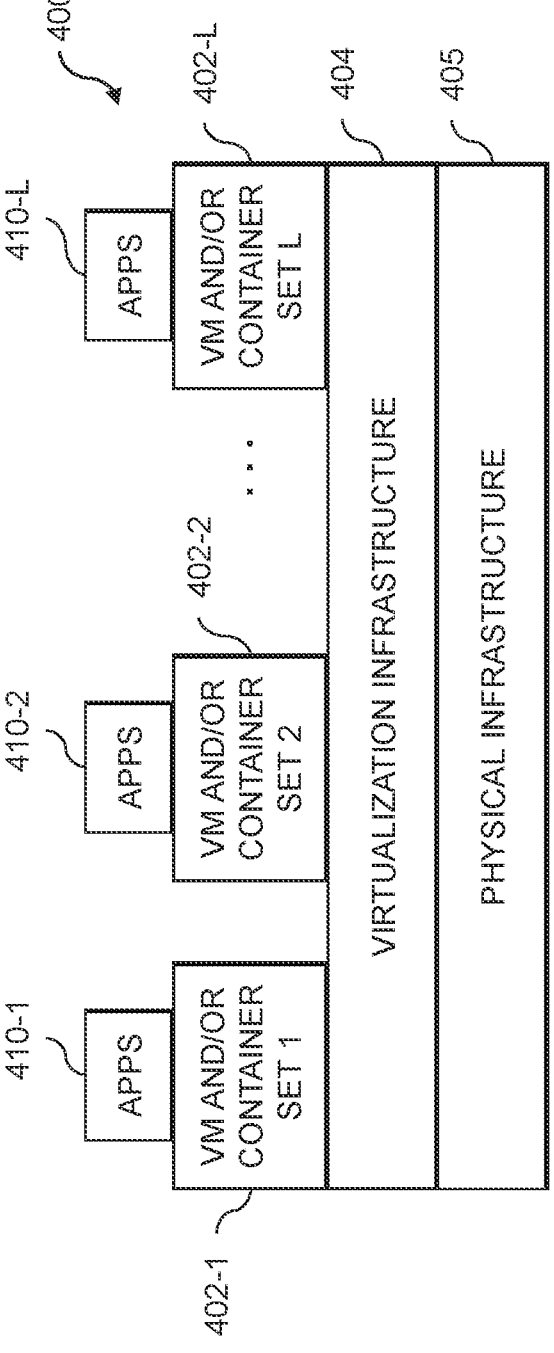
FIGS. 4 and 5 show examples of processing platforms that may be utilized to implement at least a portion of an information processing system in illustrative embodiments.
Figure 5:
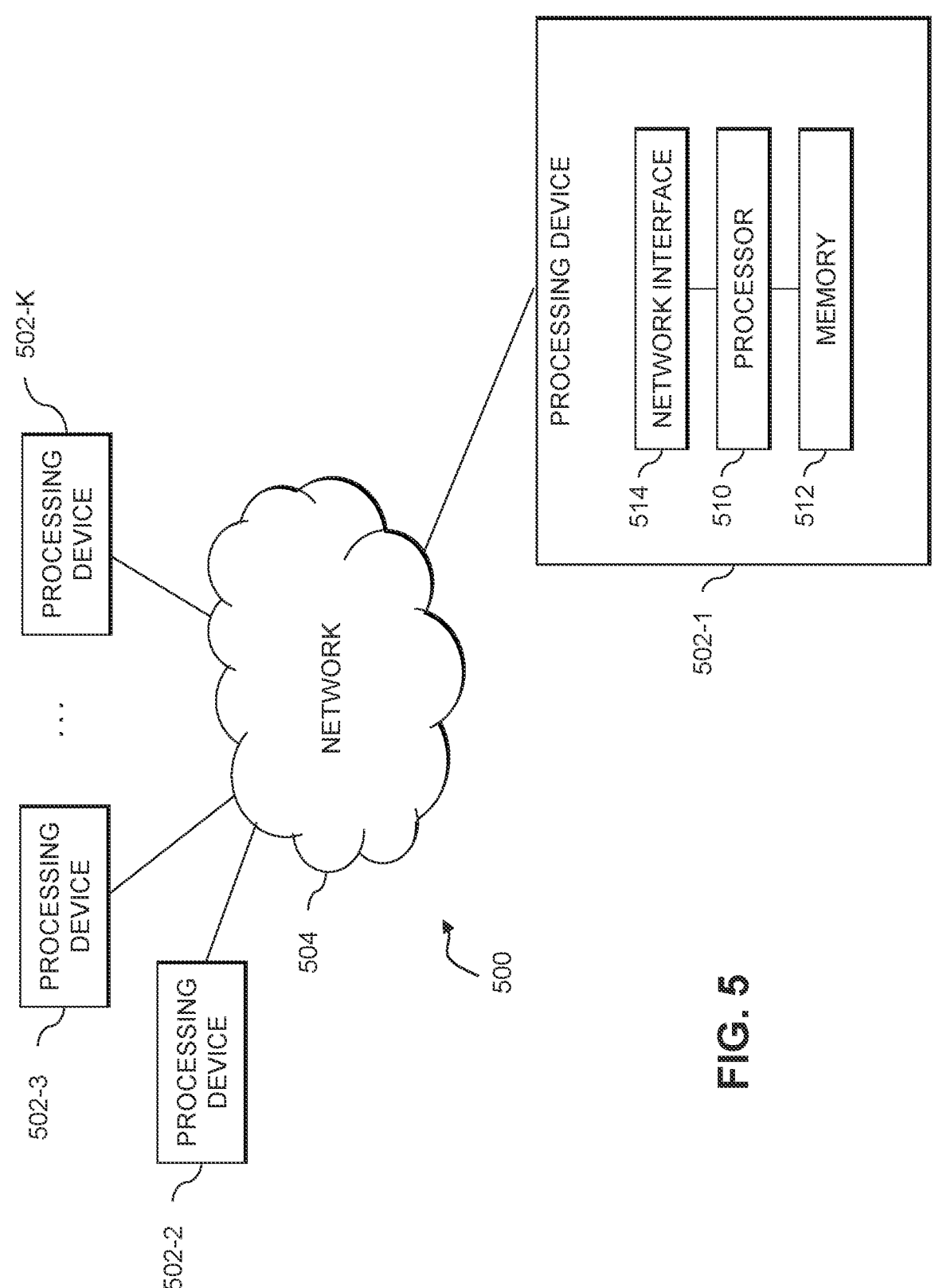

FIG. 4 shows an example processing platform comprising cloud infrastructure 400. The cloud infrastructure 400 comprises a combination of physical and virtual processing resources that may be utilized to implement at least a portion of the information processing system 100 in FIG. 1. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. A hypervisor platform may be used to implement a hypervisor within the virtualization infrastructure 404, where the hypervisor platform has an associated virtual infrastructure management system. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for usage-based access authorization for software code of multi-path input-output drivers as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, access authorization models, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured to perform steps of:

obtaining, from an access authorization server external to a plurality of host devices, a usage-based access authorization for a given piece of software associated with controlling delivery of input-output operations to a storage system over selected ones of a plurality of paths through a network, the usage-based access authorization specifying an allowable amount of usage of the given piece of software over a designated period of time;

provisioning access authorization for the given piece of software to multi-path input-output drivers of the plurality of host devices based at least in part on the obtained usage-based access authorization;

receiving, from the multi-path input-output drivers of the plurality of host devices, usage information characterizing an overall amount of usage of the given piece of software by the plurality of host devices collectively over the designated time period;

determining whether the received usage information characterizing the overall amount of usage of the given piece of software by the plurality of host devices collectively over the designated time period exceeds the allowable amount of usage of the given piece of software specified in the usage-based access authorization obtained from the access authorization server; and modifying the provisioning of the access authorization for the given piece of software to the multi-path input-output drivers of the plurality of host devices responsive to determining that the received usage information characterizing the overall amount of usage of the given piece of software by the plurality of host devices collectively over the designated time period exceeds the allowable amount of usage of the given piece of software specified in the usage-based access authorization obtained from the access authorization server.

2. The apparatus of claim 1 wherein the given piece of software comprises at least a portion of at least one of the multi-path input-output drivers.

3. The apparatus of claim 1 wherein the at least one processing device comprises a management appliance configured to manage the multi-path input-output drivers of the plurality of host devices providing respective production hosts for the given piece of software in a data center.

4. The apparatus of claim 3 wherein the obtained usage-based access authorization is utilizable for provisioning access authorization to any number of the plurality of host devices having multi-path input-output drivers managed by the management appliance.

5. The apparatus of claim 1 wherein the obtained usage-based access authorization is utilizable for provisioning access authorization independent of hardware and software platform configurations of the plurality of host devices.

6. The apparatus of claim 1 wherein the access authorization server comprises a cloud-based license server which provisions use of the given piece of software in accordance with an as-a-service usage-based licensing model.

7. The apparatus of claim 1 wherein the allowable amount of usage of the given piece of software over the designated period of time comprises a size of data transmitted between the plurality of host devices and the storage system utilizing the multi-path input-output drivers.

8. The apparatus of claim 1 wherein the allowable amount of usage of the given piece of software over the designated period of time comprises a size of data transmitted between the plurality of host devices and one or more logical units of the storage system utilizing the multi-path input-output drivers.

9. The apparatus of claim 1 wherein the allowable amount of usage of the given piece of software over the designated period of time comprises two or more allowable amounts of usage of the given piece of software over the designated period of time for two or more different types of host devices.

10. The apparatus of claim 9 wherein the two or more allowable amounts of usage comprise a first allowable amount of usage for host devices operating virtualized computing environments and a second allowable amount of usage for host devices operating physical computing environments.

11. The apparatus of claim 9 wherein the two or more allowable amounts of usage comprise a first allowable amount of usage for host devices running a first operating system and a second allowable amount of usage for host devices running a second operation system different than the first operating system.

12. The apparatus of claim 1 wherein the allowable amount of usage over the designated period of time comprises two or more allowable amounts of usage of the given piece of software over the designated period of time for data exchanged between the plurality of host devices and two or more different sets of logical units of the storage system.

13. The apparatus of claim 1 wherein the at least one processing device is further configured to perform the step of providing, to the access authorization server, overall usage information characterizing the overall amount of usage of the given piece of software by the plurality of host devices collectively over the designated time period.

14. The apparatus of claim 1 wherein the receiving, determining and modifying provisioning steps are performed at two or more periodic intervals during the designated time period.

15. A method comprising:

obtaining, from an access authorization server external to a plurality of host devices, a usage-based access authorization for a given piece of software associated with controlling delivery of input-output operations to a storage system over selected ones of a plurality of paths through a network, the usage-based access authorization specifying an allowable amount of usage of the given piece of software over a designated period of time;

provisioning access authorization for the given piece of software to multi-path input-output drivers of the plurality of host devices based at least in part on the obtained usage-based access authorization;

receiving, from the multi-path input-output drivers of the plurality of host devices, usage information characterizing an overall amount of usage of the given piece of software by the plurality of host devices collectively over the designated time period;

determining whether the received usage information characterizing the overall amount of usage of the given piece of software by the plurality of host devices collectively over the designated time period exceeds the allowable amount of usage of the given piece of software specified in the usage-based access authorization obtained from the access authorization server; and modifying the provisioning of the access authorization for the given piece of software to the multi-path input-output drivers of the plurality of host devices responsive to determining that the received usage information characterizing the overall amount of usage of the given piece of software by the plurality of host devices collectively over the designated time period exceeds the allowable amount of usage of the given piece of software specified in the usage-based access authorization obtained from the access authorization server;

wherein the method is performed by at least one processing device comprising a processor coupled to a memory.

16. The method of claim 15 wherein the at least one processing device comprises a management appliance configured to manage the multi-path input-output drivers of the plurality of host devices providing respective production hosts for the given piece of software in a data center.

17. The method of claim 15 wherein the allowable amount of usage of the given piece of software over the designated period of time comprises a size of data transmitted between the plurality of host devices and the storage system utilizing the multi-path input-output drivers.

18. A computer program product comprising a non-transitory processor-readable storage medium having stored therein program code of one or more software programs, wherein the program code when executed by at least one processing device causes the at least one processing device to perform steps of:

obtaining, from an access authorization server external to a plurality of host devices, a usage-based access authorization for a given piece of software associated with controlling delivery of input-output operations to a storage system over selected ones of a plurality of paths through a network, the usage-based access authorization specifying an allowable amount of usage of the given piece of software over a designated period of time;

provisioning access authorization for the given piece of software to multi-path input-output drivers of the plurality of host devices based at least in part on the obtained usage-based access authorization;

receiving, from the multi-path input-output drivers of the plurality of host devices, usage information characterizing an overall amount of usage of the given piece of software by the plurality of host devices collectively over the designated time period;

determining whether the received usage information characterizing the overall amount of usage of the given piece of software by the plurality of host devices collectively over the designated time period exceeds the allowable amount of usage of the given piece of software specified in the usage-based access authorization obtained from the access authorization server; and modifying the provisioning of the access authorization for the given piece of software to the multi-path input-output drivers of the plurality of host devices responsive to determining that the received usage information characterizing the overall amount of usage of the given piece of software by the plurality of host devices collectively over the designated time period exceeds the allowable amount of usage of the given piece of software specified in the usage-based access authorization obtained from the access authorization server.

19. The computer program product of claim 18 wherein the at least one processing device comprises a management appliance configured to manage the multi-path input-output drivers of the plurality of host devices providing respective production hosts for the given piece of software in a data center.

20. The computer program product of claim 18 wherein the allowable amount of usage of the given piece of software over the designated period of time comprises a size of data transmitted between the plurality of host devices and the storage system utilizing the multi-path input-output drivers.

* * * * *